United States Patent [19]

Tokarz

[11] 4,377,550
[45] Mar. 22, 1983

[54] HIGH TEMPERATURE LIQUID LEVEL SENSOR

[75] Inventor: Richard D. Tokarz, West Richland, Wash.

[73] Assignee: The United States of America as represented by the United States Department of Energy, Washington, D.C.

[21] Appl. No.: 229,498

[22] Filed: Jan. 29, 1981

[51] Int. Cl.³ .................................. G01F 23/24
[52] U.S. Cl. .......................... 376/245; 73/304 R; 340/620; 376/258; 324/65 R
[58] Field of Search .................. 376/245, 247, 258; 73/304 R; 340/620; 324/65 R, 65 P

[56] References Cited

U.S. PATENT DOCUMENTS

| 2,589,714 | 3/1952 | Lee ................................. 73/304 R |
| 3,183,715 | 5/1965 | Holmes ........................... 73/304 R |
| 4,287,472 | 9/1981 | Pan et al. ....................... 324/65 R |

Primary Examiner—Richard A. Farley

[57] ABSTRACT

A length of metal sheathed metal oxide cable is perforated to permit liquid access to the insulation about a pair of conductors spaced close to one another. Changes in resistance across the conductors will be a function of liquid level, since the wetted insulation will have greater electrical conductivity than that of the dry insulation above the liquid elevation.

6 Claims, 2 Drawing Figures

U.S. Patent  Mar. 22, 1983  4,377,550
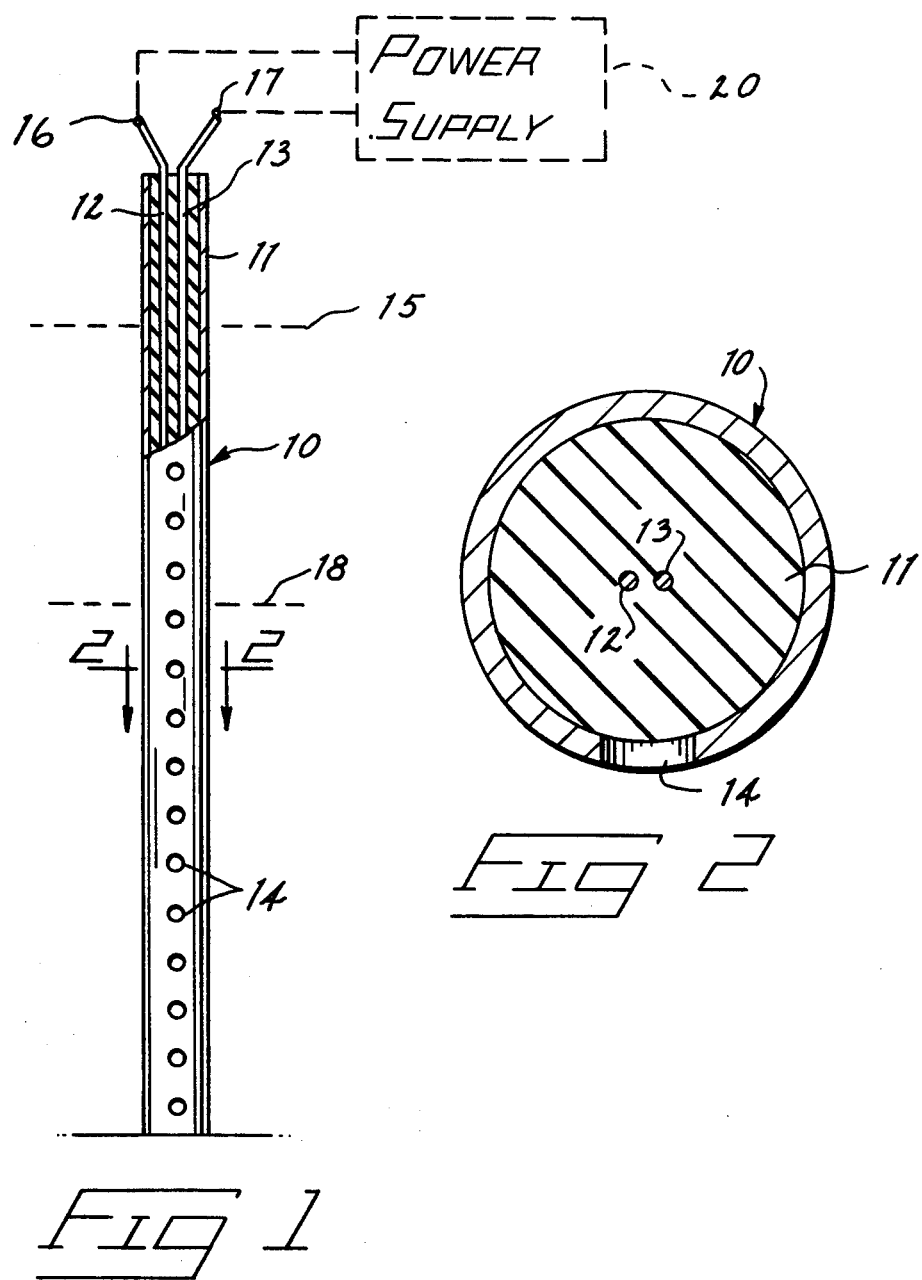

HIGH TEMPERATURE LIQUID LEVEL SENSOR

BACKGROUND OF THE INVENTION

This disclosure relates to a liquid level sensor for indicating changes in liquid level. It was developed specifically for monitoring liquid level within liquid cooled nuclear reactor vessels. It can be used during tests of reactor configurations, as well as for monitoring actual reactor operating parameters. The United States government has rights in this invention pursuant to contract No. EY-76-C-06-1830 between the U.S. Department of Energy and Battelle Memorial Institute.

This invention arose from tests requiring measurement of selected operational parameters within nuclear reactor vessels adjacent to nuclear fuel bundles. It specifically relates to tests which simulate loss of coolant accidents. Typical monitoring of liquid level is accomplished by temperature indications provided by in-core thermocouples. However, because of size and cost limitations, such thermocouples are typically located at discrete locations about the core and are limited in number. As a result, there is no specific indication of cooling liquid level available to guide operators of a reactor in recovering the core and maintaining adequate cooling.

The present liquid level sensor has been designed to withstand high radiation levels in a reactor core as well as continuous immersion in cooling liquid. It must also withstand the very high steam temperatures which will exist above the liquid level during a loss of coolant accident. Temperatures during such conditions can reach as high as 2500 K.

SUMMARY OF THE INVENTION

The sensor comprises an upright length of metal sheathed metallic oxide cable having two interior conductors. A plurality of discrete perforations are formed through the sheath and are elevationally spaced along the device to assure liquid communication between the cable insulation and the environment outside the cable. Output terminals are provided at the upper ends of the two conductors for resistance measurement purposes. The measured resistance across the conductors will be indicative of liquid level, since the immersed portion of the cable will short across the two conductors and thereby vary the resistance across their upper terminals as a function of liquid level.

It is an object of this invention to provide a simple liquid level sensing device with no moving parts.

Another object of this invention is to provide a liquid level sensor which is reversible and capable of measuring both increases or decreases in liquid level. Another object of this invention is to provide a sensor capable of withstanding the severe environmental conditions encountered within a nuclear reactor vessel during a loss of coolant accident.

DESCRIPTION OF THE DRAWINGS

FIG. 1 is a fragmentary side elevation view of the device;

FIG. 2 is an enlarged transverse sectional view taken along line 2—2 in FIG. 1.

DESCRIPTION OF THE PREFERRED EMBODIMENT

This disclosure relates to a sensor and process for measuring liquid level within a reactor vessel. It is designed for monitoring conditions that exist during a loss of coolant accident so as to provide a direct indication of liquid level at any instant.

The device comprises a single elongated length of metal sheathed magnesium oxide or aluminum oxide cable with two conductors. Both the sheath and the conductors must be fabricated from metals with melt temperatures greater than the highest expected temperature which might exist during a loss of coolant accident. Alternately, the sensor must be physically located at a position where a lower temperature is expected to exist. This could be accomplished by placement of the device near a control rod or at some other thermally cool location within the reactor vessel.

Referring to FIGS. 1 and 2, the sensor comprises a length of sheathed cable constructed in the manner of conventional metal sheathed cable such as is used in electrical resistance heating elements. Such cables are swaged from a billet constructed with an exterior length of tubing surrounding interior conductors and metallic oxide insulation material. After being swaged, the sheath compresses about the insulation and the interior electrical conductors.

The exterior sheath of the cable is indicated at 10. It surrounds a mass of metallic oxide insulation 11 and two interior conductors 12 and 13. For high temperature usage, the sheath 10 and conductors 12 and 13 would typically be fabricated from tungsten or another metal or alloy capable of withstanding extremely high temperatures.

The sheath 10 is perforated along its length, as shown by the openings 14. The openings 14 provide discrete perforations elevationally spaced along the height of the sheath. In this manner, the metallic oxide insulation is exposed to the exterior of the cable and liquid communication is provided between the insulation and its exterior environment.

During normal operation of the reactor or test core, the entire length of the level detector is immersed in water beneath the normal liquid level elevation indicated by the line 15 in FIG. 1. Measurement of resistance between the two conductors 12 and 13 from their upper ends at terminals 16 and 17 will result in an indication that is a function of the characteristic resistant of the conductors from terminals 16 and 17 to the line 15. Metallic oxides, in the presence of water, have a characteristic low resistance across the conductors even though the water itself has very high electrical resistance. The electrical circuit therefore shows a "short" across the high resistance conductors at the liquid level elevation.

During either a planned or accidental loss of coolant accident, temperatures within the reactor vessel and above the liquid will increase and coolant flow will either decrease or stop. The liquid will reach its boiling temperature at the vessel pressure, and vapor or steam will form above the liquid level elevation.

As the liquid level drops beneath the line 15, the openings 14 along the sheath 10 of the sensor will be exposed to very high temperature liquid vapor or steam, which is very dry at such elevated temperatures. The insulation within the sensor will also be subjected to increased thermal absorption from radiation and radiant heat from nearby fuel rods. Liquid within the insulation will be evaporated. The drying of the insulation will increase the resulting electrical resistance across the two conductors 12 and 13 above the liquid level. Changes in liquid level to a lower elevation such as shown at line 18 will be indicated as increasing resistance across the terminals 16 and 17 as a function of the increased length of high resistance conductors between the terminals and the lower liquid level 18. Resistance changes will be related to time and can be plotted as a function of time to provide an indication of the rate of change of the water level to determine the rate of loss of the coolant liquid.

Since the liquid, when boiling, would have a very active surface, the elevation of liquid measured at any point along the perforated sheath 10 will vary substantially. To minimize this effect, the two conductors 12 and 13 are located adjacent to the center of the metallic oxide insulation within the cable and the separation between the two conductors 12 and 13 and the sheath 10 is substantially greater than the separation between the two conductors themselves. This is evident in FIG. 2, which indicates a substantially larger volume of insulation 11 positioned between the conductors 12 and 13 and the surrounding outer sheath 10. The mass of insulation serves to isolate the resistivity of the conductors 12 and 13 from the surface effects of boiling liquid. The width of the insulation layer between the conductors 12 and 13 and the surrounding sheath 10 represents a time constant for averaging measurement of liquid level that can be varied to fit anticipated requirements so as to compensate for surface turbulence.

The present process basically comprises the steps of submerging the cable in an upright position along the elevation to be monitored within a liquid cooled nuclear reactor and measuring the resistance across the upper ends of the conductors. In the event that measuring resistance is a problem or drying of the metallic oxide insulation is not sufficiently rapid to provide a practical readout of resistance changes, the process can be modified to provide added heat above the liquid level. This is accomplished by applying electrical current through the conductors in an amount sufficient to dry the cable insulation at elevations above the liquid level due to the inherent resistivity of the conductors. By applying voltage from a power source 20 across the terminals 16 and 17, the inherent resistivity of the conductors will generate additional heat in the exposed portion of the sensor. The immersed portion of the sensor will still act as a short circuit across the conductors and will have no appreciable heating effect upon them.

The heating of the exposed elevations along conductors 12 and 13 is enhanced by the fact that high melt temperature metals which would be used in their construction typically have high electrical resistance and are characteristically used in immersion heating rods. By holding the applied current from the power source 20 constant, one can measure the applied voltage as a function of liquid level in the vessel being monitored.

I claim:

1. A high temperature liquid level sensor, comprising:
   an upright length of metal sheathed metallic oxide cable having two interior conductors arranged parallel to one another and spaced apart by metallic oxide insulation, the materials comprising the sheath and conductors having melting temperatures above that of the highest expected temperature at the location being monitored;
   output terminal means at the upper ends of the two conductors for operative attachment to resistance measuring equipment;
   and a plurality of discrete perforations formed through the sheath and spaced elevationally along the height of the sheath for providing liquid communication between the cable insulation and the environment outside the cable.

2. A liquid level sensor as claimed in claim 1 wherein the two conductors are located adjacent to the center of the cable.

3. A liquid level sensor as claimed by claim 1 wherein the two conductors are located adjacent to the center of the cable, the separation between the two conductors and sheath being substantially greater than the separation between the two conductors themselves.

4. A liquid level sensor as claimed by claim 1 wherein the insulation within the cable is magnesium oxide or aluminum oxide.

5. A process for sensing liquid level at very high temperatures in a liquid cooled nuclear reactor, comprising the following steps:
   submerging a length of perforated metal sheathed cable having two interior conductors and metallic oxide insulation in an upright position along the elevation to be monitored;
   and measuring the resistance across the upper ends of the conductors.

6. A process as claimed in claim 5 further comprising the following step:
   applying electrical current through the conductors in an amount sufficient to dry the cable insulation at elevations above the liquid level due to the resistivity of the conductors.

* * * * *